United States Patent [19]

Hansson

[11] 4,380,102
[45] Apr. 19, 1983

[54] CLASPING DEVICE

[76] Inventor: Erik G. Hansson, Stughemmet, S-56242, Sandhem, Sweden

[21] Appl. No.: 166,233

[22] Filed: Jul. 7, 1980

[30] Foreign Application Priority Data

Jun. 2, 1980 [SE] Sweden .................................. 8004095

[51] Int. Cl.³ ............................................. A44B 24/00
[52] U.S. Cl. ................................. 24/248 SA; 24/257; 24/268; 24/285
[58] Field of Search ........ 24/248 SA, 248 E, 248 LS, 24/257, 259 R, 279, 285, 19, 268; 285/419, 421; 248/748, 316 D, 226.3; 269/234

[56] References Cited

U.S. PATENT DOCUMENTS

| | | | |
|---|---|---|---|
| 142,388 | 6/1873 | Goble | 285/419 |
| 715,222 | 12/1902 | Werth | 285/419 |
| 1,021,185 | 3/1912 | Foster | 403/289 |
| 3,181,900 | 5/1965 | Hayward | 285/421 |
| 4,189,810 | 2/1980 | Beziat | 24/248 E |

FOREIGN PATENT DOCUMENTS

| | | | |
|---|---|---|---|
| 530774 | 9/1956 | Canada | 285/421 |
| 1094515 | 12/1954 | France | 285/421 |

*Primary Examiner*—Robert A. Hafer
*Attorney, Agent, or Firm*—Cushman, Darby & Cushman

[57] ABSTRACT

The invention provides a clasping device that is simple to utilize and remove, and comprises a minimum number of operating components, yet is capable of efficiently performing a clasping function. A base is provided having first and second ends with an object-receiving surface disposed between the ends. A hasp, which preferably is of inextensible but flexible material, has first and second ends operatively cooperating with the base first and second ends, and has an object-receiving surface disposed between its ends. A conical screw acts between the base and the hasp for, when it is advanced, effecting relative movement between the hasp and base object-receiving surfaces to cause the object to be tightly clasped therebetween. The first and second ends of the base and hasp may take a wide variety of forms depending upon the particular nature of the hasp itself, the object to be held, and the environment.

14 Claims, 8 Drawing Figures

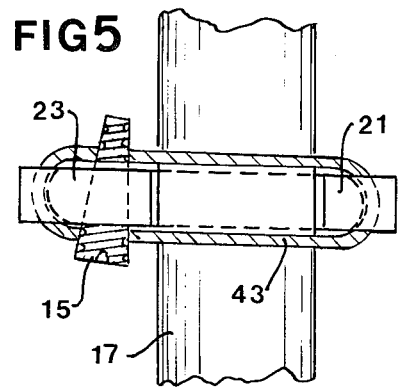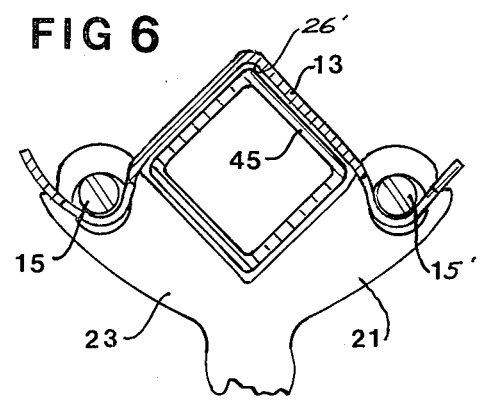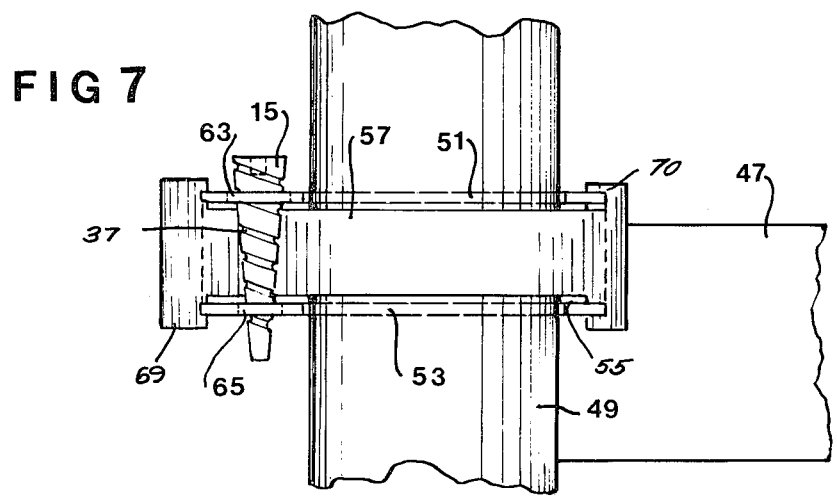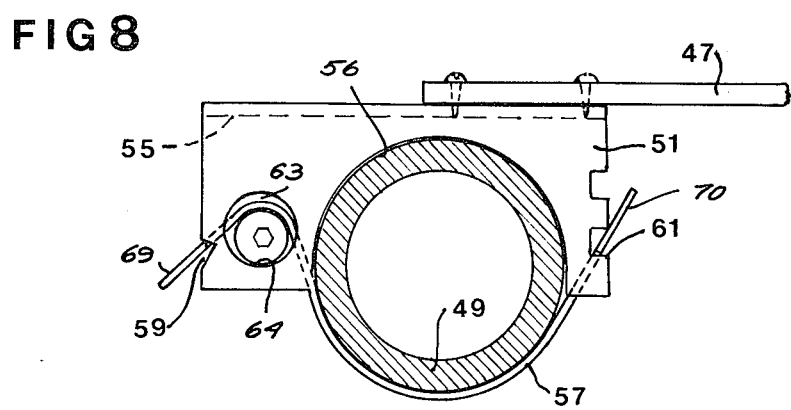

CLASPING DEVICE

BACKGROUND AND SUMMARY OF THE INVENTION

The invention relates to a clasping device, primarily for such a device to positively hold an object in place such as a rod, pole, tube, post, or the like. Conventional clasping devices include a holder and a yoke pivoted together at one end, with a detachable nut and bolt connection at the other end to draw the holder and yoke together to effect the clamping action. Such conventional clasping devices (such as shown in Swedish Pat. No. 227,781 and U.S. Pat. No. 3,913,188) are effective for securely holding an object in place, however they are sometimes difficult to assemble and disassemble. When used outdoors, the nuts are likely to rust to the bolts making removal difficult, and the component parts must be designed with the particular object to be held in mind.

According to the present invention a simple yet effective clasping device is provided that eliminates many of the drawbacks inherent in the prior art, and in general provides a structure that is simple and easy to operate, contains a minimum number of parts, and can be constructed, if desired, so as to accommodate a variety of different objects.

According to one aspect of the present invention, a clasping device is provided for releasably tightly clasping an object, and consists essentially of: A base having first and second ends with an object-receiving surface disposed between the first and second ends. A hasp having first and second ends operatively cooperating with the base first and second ends, and having an object-receiving surface disposed between the first and second ends. And conical screw means for operatively acting between the base and the hasp so that as the screw means advances it effects relative movement between the hasp and base object-receiving surfaces (e.g. the base and hasp first ends are moved apart while the hasp and base object-receiving surfaces are effectively moved closely together). The hasp may take a wide variety of forms. Preferably it is an inextensible but flexible piece of material such as a wire (endless loop) or a strip of thin sheet steel.

The base, hasp, and conical screw means may take a variety of forms. The base means first end has means defining an opening therein having an area substantially larger than at least the smallest cross-sectional area of the conical screw means and edge means having a thickness for engaging within the grooves of the conical screw means and allowing longitudinal displacement of the conical screw means upon rotation thereof when in engagement with the edge means. The hasp first end has a curved surface means for engaging the conical screw means so that as the conical screw means passes through the base means first end opening, with the base and hasp means second ends in operative engagement, it engages the edge means and the hasp means first end curved surface and as it is rotated it moves longitudinally of the edge means and moves the edge means and curved surface farther apart, which in turn moves the hasp and base means object-receiving surfaces closer together. The hasp first end preferably includes slot means formed therein for defining a slot having a thickness greater than the width of the base means first end so that the base means first end may pass through the slot, with a portion of the hasp means first end curved surface means disposed on each side of the base means for engaging the conical screw means when it passes through the base means first end opening. The base means second end may comprise a notched plate with the hasp means second end including slot means formed therein for engaging the notched plate; or the second ends of the base end hasp can be formed like the first ends, and conical screw means associated therewith.

Under some circumstances, such as when it is desirable to provide a device that can clasp objects having a variety of surface configurations and sizes, the hasp may comprise an endless loop wire.

It is the primary object of the present invention to provide a simple, effective, and readily adaptable clasping device. This and other objects of the invention will become clear from an inspection of the detailed description of the invention, and from the appended claims.

BRIEF DESCRIPTION OF THE DRAWINGS

FIG. 5 is a top plan view of another embodiment of an exemplary holder according to the present invention clamping a rod;

FIG. 6 is an end view, partly in cross-section and partly in elevation, of still another embodiment of a holder according to the present invention shown clasping an object; and FIGS. 7 and 8 are top plan and side views, respectively, of yet another exemplary embodiment of a holder according to the present invention clamping a sign post and with a sign affixed to the base.

DETAILED DESCRIPTION OF THE DRAWINGS

Figure 1:
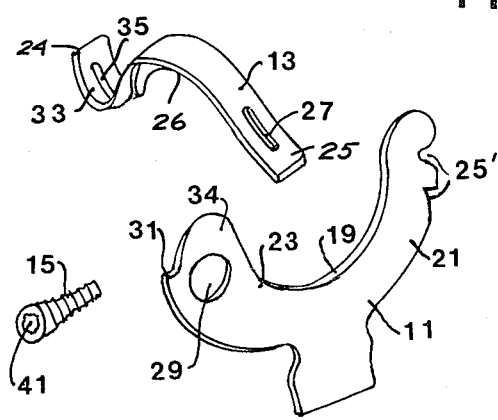
FIG. 1 is a perspective view of an exemplary clasping device according to the present invention.

The three basic components of the holder according to the present invention include the base or base means 11, the hasp or hasp means 13, and the conical screw or screw means 15. Each of these elements may take a wide variety of forms depending upon the particular objects to be held, environment, etcetera. The base 11 includes first 23 and second 21 ends with means defining an exterior surface 19 thereof for receiving an object (e.g. rod 17) thereon disposed between the ends 21, 23. The hasp 13 includes first and second ends 24, 25 with means defining an exterior surface 26 thereof for receiving an object thereon. The first and second ends 24, 25 of the hasp operatively cooperate with the first and second ends 23, 21 of the base 11. The conical screw means acts between at least the base first end 23 and the hasp first end 24 so that as the screw means 15 is advanced it effects relative movement between the hasp and base object-receiving surfaces 26, 19 (preferably portions of the hasp and base first ends are moved apart as the hasp and base object-receiving surfaces are effectively moved closer together to clamp the object 17).

In the embodiment illustrated in FIGS. 1 through 4 of the drawings, the hasp 13 comprises a substantially inextensible but flexible piece of material, such as thin sheet steel or the like. The sheet steel is formed so that a curved surface means 33 is formed in the first end 24 for engaging the conical screw means 15, and the object-receiving surface 26 also is shaped to have a curvature generally corresponding to the curvature of the rod 17 to be clasped thereby. Slots 27 and 35 are formed in the hasp second 25 and first 24 ends, respectively.

The base 11 includes means defining an opening 29 in the first end 23 thereof. The opening 29 has an area substantially larger than at least the smallest cross-sectional area of the conical screw means 15 (see FIGS. 3 and 4 in particular), and edge means 39 define the opening 29. The edge means have a thickness for engaging within the grooves 37 of the conical screw means 15 and allow longitudinal displacement of the conical screw means upon rotation thereof when in engagement therewith.

Figure 2:
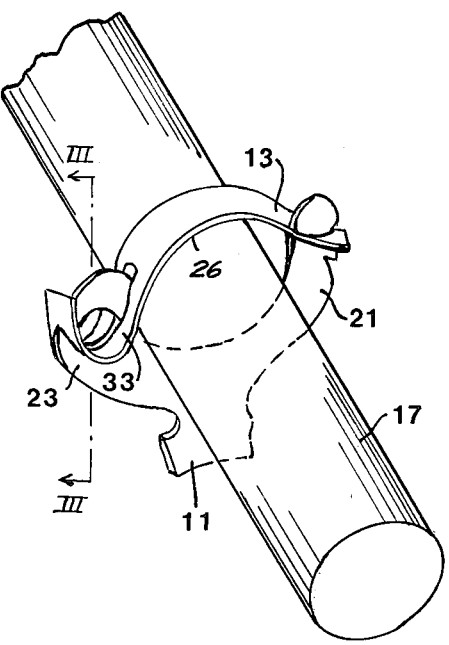
FIG. 2 is an assembly view of the device of FIG. 1 shown clamping a rod, with the conical screw removed for clarity.

Cooperation between the second ends 21, 25 of the base 11 and hasp 13 in the FIGS. 1 through 4 embodiment is provided by the slot 27 passing over the top of the second end 21 of the base 11 (which has a plate configuration), it being received by a notch 25' (see FIG. 2). At the same time, the top-most plate-like portion 34 of the base 11 passes through the slot 35 in the hasp first end 24, with the end of the slot 35 most remote from the object-receiving surface 26 engaging notch 32 in step 31 of base 11 (see FIGS. 2 and 4 in particular).

Figure 3:
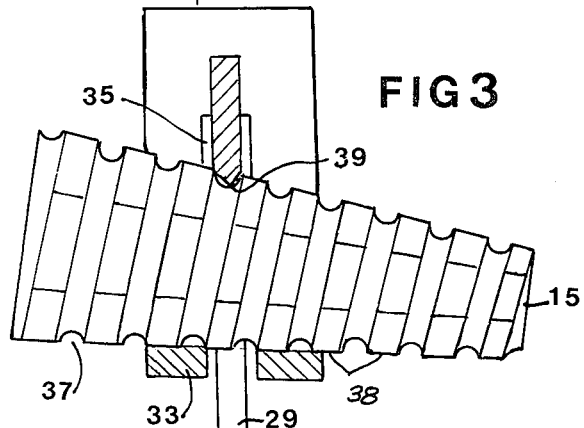
FIG. 3 is a side view partly in cross-section and partly in elevation taken along lines III—III of FIG. 2, with the conical screw in place.

In the FIGS. 1 through 4 embodiment, when the conical screw means is inserted into the opening 29 with the top-most portion 34 of base 11 passing through slot 33, the conical screw means grooves 37 will engage the edge means 39 while the ridges 38 will engage portions of the curved surface 33 of hasp 13 on either side of plate 11 (see FIG. 3). Advancement of the screw means 15 will then cause the edge means 39 and curved surface 33 to be moved further apart (e.g. by bending of the portion 33) while the object-receiving surface means 26, 19 are moved closer together to clamp the rod 17 (e.g. by straightening surface 26). Stretching of the hasp 13 around the rod 17 corresponds to the increased length of the bend 33 and adjoining straight portions, which length of bend increases more quickly than the corresponding increase in the diameter of the screw means 15 at the thread engagement edge 39. This is because not only the curved portion 33, but also the two straight portions adjacent it, increase in length at the same time.

Figure 4:
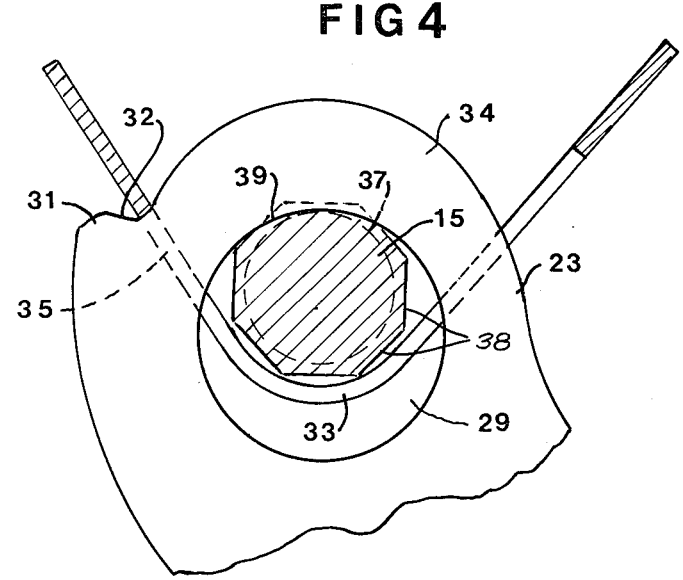
FIG. 4 is a side view partly in cross-section and partly in elevation taken along lines IV—IV of FIG. 3.

When the screw 15 has been turned enough to provide the desired clamping pressure of the hasp 13 against the rod 17, there is self-locking of the screw due to the frictional engagement between the low pitch helical thread of the screw 15 and the components of the base 11 and hasp 13 that it engages. However to enhance the locking effect to prevent rewinding due to vibration, etcetera, it is preferable to make the screw so that the ridges 38 thereof are polygons in cross-section (e.g. octagonal as shown in FIGS. 3 and 4). Alternatively, longitudinal furrows and ridges may be provided so that the conical face of the screw is dotted with knurls or teeth (being toothed in cross-section). Rotation of the screw means 15 may be effected by insertion of an Allen wrench or the like into opening 41 in its head portion (see FIG. 1).

In the embodiment according to the invention illustrated in FIG. 5, the hasp means comprises an endless wire loop 43. Opposite portions of the loop 43 are laid into notches 32, 25' and the wire 43 is flexed so that the when the screw 13 is inserted through the opening 29 to engage the edge means 39 it also engages a portion of the wire 43. This embodiment of the invention allows the clamping device to conform to a wide variety of surface shapes and sizes of objects (e.g. rod 17) to be clasped, and if desired the base 11 can be substantially shortened so that the loop 43 encircles more than half the circumference (periphery) of the object to be held.

In the embodiment of FIG. 6, the hasp 13 object-receiving surface 26' is shaped to receive a square-section tube 45, and the second ends of the base 11 and hasp 13 are constructed like the first ends and a second conical screw means 15' is utilized to effect the clamping action.

In the embodiment illustrated in FIGS. 7 and 8, the object being clamped is a tubular sign post 49 or the like, and a sign 47 is rigidly attached to the base. In this case the base comprises first and second substantially parallel spaced apart plates 51, 53. The plates 51, 53 are connected together by the cross member 55, and the sign 47 is connected to that cross component 55. Means are provided defining an opening 63, 65 in each of the plates corresponding to the opening 29 in the FIGS. 1 through 4 embodiment. Each opening has edge means (e.g. see edge 64 in FIG. 8) associated therewith for engaging the groove 37 of the conical screw means 15 and allowing longitudinal displacement of the conical screw means upon rotation thereof when in engagement with the edge means. Notches 61 are formed in the second end of the plates 51, 53 on the opposite side of the screw-engaging openings 63, 65 of the object-receiving surface 56 of the base. Notches 59 are formed in the plates 51, 53 adjacent the apertures 63, 65. The plates 51, 53 are spaced relative to the conical screw means 15, and the apertures 63, 65 are dimensioned with respect to each other, in the same manner as provided in U.S. Pat. No. 4,167,355 (the disclosure of which is hereby incorporated by reference herein).

The hasp means in the FIGS. 7 and 8 embodiment includes the thin piece of strip steel 57. The hasp 57 has a width less than the spacing between the plates 51, 53 (see FIG. 7), but at the first and second ends thereof includes cross members 69, 70, respectively wide enough to span the plates 51, 53 and be received by the notches 59, 61 respectively.

Of course the above embodiments are merely exemplary and many modifications thereof may also be provided. For instance the hasp may be permanently connected to the base at one end thereof, by means of an integral or separate-structure hinge. Also, while the screw-receiving opening formed in the base is defined with respect to one end of the base for clarity of description, for particular configurations of the object to be held, hasp, and base, such opening may be located midway between the ends (the claim terminology encompassing such a modification). Additionally a wide variety of other structures may be provided, besides the notches 25', 32, etcetera, as the means for providing pivotal connections between the hasp and base first and second ends.

It will thus be seen that according to the present invention a simple yet effective clasping device has been provided with a minimum number of component parts, which is easy to assemble and disassemble with essentially no risk of a corrosive fixation between desirably relatively movable parts, and which after a few turns of a screw allows the screw to be free of the edge with which it cooperates so that it can be withdrawn without further turning. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A clasping device for releasably tightly clasping an object, comprising:
   base means;
   hasp means; and
   conical screw means;
   said base means having: means defining an exterior surface thereof for receiving an object thereon; a first end and a second end disposed on opposite sides of said surface, said first end having: means defining an opening therein having an area substantially larger than at least the smallest cross-sectional area of said conical screw means; and edge means having a thickness for engaging within the grooves of said conical screw means and allowing longitudinal displacement of said conical screw means upon rotation thereof when in engagement with said edge means; and
   said hasp means having: means defining an exterior surface thereof for receiving an object thereon; a first end and a second end of said hasp means disposed on opposite sides of said surface, said hasp means second end operatively pivotally mounted to said base means second end; said hasp means first end having curved surface means for engaging said conical screw means so that as said conical screw means passes through said base means first end opening, with said base and hasp means second ends in operative engagement, it engages said edge means and said hasp means first end curved surface, and as it is rotated it moves longitudinally of said edge means and moves said edge means and curved surface further apart, which in turn moves said hasp and base means object-receiving surfaces closer together; and
   said hasp means being so constructed that as said hasp means first end curved surface means is engaged by said conical screw means a bending of said first end takes place as said object-receiving surface means is straightened, effecting tightly clamping of an object received thereby.

2. A device as recited in claim 1 wherein said hasp means first end includes slot means formed therein for defining a slot having a thickness greater than the width of said base means first end so that said base means first end may pass through the slot, with a portion of said hasp means first end curved surface means disposed on each side of said base means for engaging said conical screw means when it passes through said base means first end opening and engages said edge means.

3. A device as recited in claims 1 or 2 wherein said base means second end comprises a notched plate, and wherein said hasp means second end includes slot means formed therein for defining a slot having a thickness greater than the width of said notched plate and a slot end for engaging a notch of said notched plate.

4. A device as recited in claim 2 wherein said base means first end comprises a plate having a notch formed in a portion thereof formed on the opposite side of said first end opening as said base means object-receiving exterior surface, said hasp means first end including a slot end received in said notch.

5. A device as recited in claim 1 wherein said hasp means and base means object-receiving exterior surfaces are arcuate surfaces having substantially the same degree of curvature.

6. A device as recited in claim 1 further comprising means for fixedly mounting said base means to a stationary object.

7. A device as recited in claim 1 wherein said base means comprises first and second substantially parallel spaced apart plates; means defining an opening in each of said plates, each opening having edge means associated therewith for engaging the grooves of said conical screw means and allowing longitudinal displacement of said conical screw means upon rotation thereof when in engagement with said edge means; and
   wherein said hasp means first end curved surface has a width less than the spacing between said first and second plates.

8. A device as recited in claim 7 wherein said base means second end comprises notched edges of said first and second plates, and wherein said hasp means second end comprises a cross member wide enough to span and be received by cooperating notches of said first and second plates notched edges.

9. A device as recited in claims 7 or 8 wherein said base means first end comprises notches formed on edges of said first and second plates on the opposite side of said openings as said object-receiving surface; and wherein said hasp means first end comprises a cross member wide enough to span and be received by cooperating notches of said first and second plates notched edges, and disposed on the opposite side of said first end curved surface as said hasp means object-receiving surface.

10. A device as recited in claim 1 wherein said base means first and second ends each have a notched edge associated therewith, and wherein said hasp means comprises an endless wire loop means for engaging notches in edges of both said hasp means first and second ends while forming said curved surface and object-receiving surface, said surfaces being formable at any points along the length thereof once said loop means engage notches in both said base means ends.

11. A clasping device for releasably tightly clasping an object, comprising:
   base means;
   hasp means; and
   conical screw means;
   said base means having: means defining an exterior surface thereof for receiving an object thereon; a first end a second end disposed on opposite sides of said surface, said first end having: means defining an opening therein an area substantially larger than at least the smallest cross-sectional, area of said conical screw means; and edge means having a thickness for engaging within the grooves of said conical screw means and allowing longitudinal displacement of said conical screw means upon rotation thereof when in engagement with said top edge means;
   said hasp means having: means defining an exterior surface thereof for receiving an object thereon; a first end and a second end of said hasp means disposed on opposite sides of said surface, said hasp means second end operatively pivotally mounted to said base means second end; said hasp means first end having curved surface means for engaging said conical screw means so that as said conical screw means passes through said base means first end opening, with said base and hasp means second ends in operative engagement, it engages said edge means and said hasp means first end curved surface, and as it is rotated it moves longitudinally of said edge means and moves said edge means and curved surface further apart, which in turn moves said hasp and base means object-receiving surfaces closer together;

said base means second end comprising a notched plate, and said hasp means second end including slot means formed therein for defining a slot having a thickness greater than the width of said notched plate and a slot end for engaging a notch so said notched plate; and said base means first end comprising a plate having a notch formed in a portion thereof formed on the opposite side of said first end opening as said base means object-receiving exterior surface, said hasp means first end including a slot end received in said notch.

12. A device as recited in claims 1 or 11 wherein said hasp means comprises a strip of inextensible bendable material such as thin sheet steel.

13. A device as recited in claim 1 wherein said conical screw means is angular in cross-section.

14. A device as recited in claim 11 wherein said hasp means is so constructed that as said hasp means first end curved surface means is engaged by said conical screw means a bending of said first end takes place as said object-receiving surface means is straightened.

* * * * *